United States Patent
Bennett

(10) Patent No.: US 7,936,725 B2
(45) Date of Patent: *May 3, 2011

(54) PASSIVE PROBING FOR HANDOVER IN A LOCAL AREA NETWORK

(75) Inventor: Richard L. Bennett, Southlake, TX (US)

(73) Assignee: Motorola Solutions, Inc., Schaumburg, IL (US)

( * ) Notice: Subject to any disclaimer, the term of this patent is extended or adjusted under 35 U.S.C. 154(b) by 929 days.

This patent is subject to a terminal disclaimer.

(21) Appl. No.: 11/236,235

(22) Filed: Sep. 27, 2005

(65) Prior Publication Data

US 2006/0023661 A1 Feb. 2, 2006

Related U.S. Application Data

(62) Division of application No. 10/650,950, filed on Aug. 28, 2003, now Pat. No. 6,980,535.

(51) Int. Cl.
*H04W 4/00* (2009.01)
*H04W 36/00* (2009.01)

(52) U.S. Cl. ........ 370/332; 370/333; 370/334; 455/437; 455/440; 455/443

(58) Field of Classification Search .......... 370/328–341, 370/310–314, 315, 219, 217, 234; 455/450, 455/525

See application file for complete search history.

(56) References Cited

U.S. PATENT DOCUMENTS

| | | | |
|---|---|---|---|
| 5,465,389 A * | 11/1995 | Agrawal et al. | 455/437 |
| 5,999,816 A * | 12/1999 | Tiedemann et al. | 455/437 |
| 6,088,591 A * | 7/2000 | Trompower et al. | 370/331 |
| 6,665,269 B1 | 12/2003 | Schmitz | |
| 6,674,738 B1 | 1/2004 | Yildiz et al. | |
| 6,870,822 B2 | 3/2005 | Balogh | |
| 6,950,655 B2 * | 9/2005 | Hunkeler | 455/426.1 |
| 6,985,465 B2 * | 1/2006 | Cervello et al. | 370/333 |
| 2002/0060995 A1 | 5/2002 | Cervello et al. | |
| 2003/0107990 A1 | 6/2003 | Herschleb et al. | |

(Continued)

FOREIGN PATENT DOCUMENTS

EP 1257092 B1 1/2005

(Continued)

OTHER PUBLICATIONS

Israeli Patent Application 173329—Office Action dated Aug. 26, 2010—Translation—3 pages.

*Primary Examiner* — Daniel J Ryman
*Assistant Examiner* — Thinh D Tran

(57) ABSTRACT

A WLAN (108) includes a first access point (104) for providing wireless service within a first coverage area, a second access point (106) for providing wireless service within a second coverage area and programmed to transmit probe responses, and a wireless communications unit (102) located within the first coverage area and operating on the wireless service of the first access point (104). The communications unit (102) is programmed to monitor, or passively probe, for the probe responses, or is instructed by the first access point (104) on when to monitor for the probe responses, transmitted by the second access point (106). By executing such passive probing, the communications unit (102) may make handover decisions for switching between the wireless service of the first access point (104) to the wireless service of the second access point (106) based on access point data included in the probe responses.

10 Claims, 4 Drawing Sheets

| U.S. PATENT DOCUMENTS | | |
|---|---|---|
| 2003/0134642 A1 | 7/2003 | Kostic et al. |
| 2003/0139197 A1 | 7/2003 | Kostic et al. |
| 2003/0142651 A1 | 7/2003 | Matta et al. |
| 2004/0001511 A1 | 1/2004 | Matta |
| 2004/0137905 A1 | 7/2004 | Jeong et al. |
| 2004/0137908 A1 | 7/2004 | Sinivaara et al. |
| 2004/0202141 A1 | 10/2004 | Sinivaara et al. |
| 2004/0224690 A1 | 11/2004 | Choi et al. |

| FOREIGN PATENT DOCUMENTS | | | |
|---|---|---|---|
| EP | 130073 | B1 | 3/2006 |
| JP | 2001094572 | | 4/2001 |
| WO | 0139538 | A1 | 5/2001 |
| WO | 0197545 | A2 | 12/2001 |
| WO | 03039054 | A2 | 5/2003 |

* cited by examiner

PASSIVE PROBING FOR HANDOVER IN A LOCAL AREA NETWORK

RELATED APPLICATIONS

This is a divisional of U.S. application Ser. No. 10/650,950, filed Aug. 28, 2003 now U.S. Pat. No. 6,980,535 B1.

FIELD OF THE INVENTION

The present invention relates in general to wireless communications, and more specifically to providing handover of wireless service between access points of a wireless network.

BACKGROUND OF THE INVENTION

Wireless Local Area Networks (WLAN) can provide a user with such amenities as high-speed wireless Internet access and an alternative for telephony services as well as other real-time applications. Such WLANs use radio frequency transmissions to communicate between roaming communications units and access points. The access points provide wireless service to a small coverage area and are connected to an infrastructure that electronically connects all of the access points to a data network including, routers, host servers, and all available internet services. The wired infrastructure and the access points make up an information distribution network used for the transfer of information and for communications.

In conventional WLANs, when a communications unit operating with a first access point detects that it is losing or has lost wireless service at its current location, it probes channels to locate other available access points. Specifically, the standard IEEE 802.11 WLAN operation for probing is for the communications unit to send a probe request to a second particular access point and for that access point to send a probe response as soon as it can send such a response based on a traffic contention algorithm. The communications unit then requests an association with the second access point. However, in operation, the probing and association processes consume battery power and typically take hundreds of milliseconds. During this time, the user can experience unsatisfactory service, or even worse, a dropped call or link. In addition to a loss of time, a delay or loss of packets may occur before the communications unit discovers that a handover is required.

Therefore, what is needed is a method and apparatus for providing a fast handover of a link or a connection between a first and a second access point within a wireless communications network.

BRIEF DESCRIPTION OF THE DRAWINGS

The accompanying figures, where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

Figure 1:
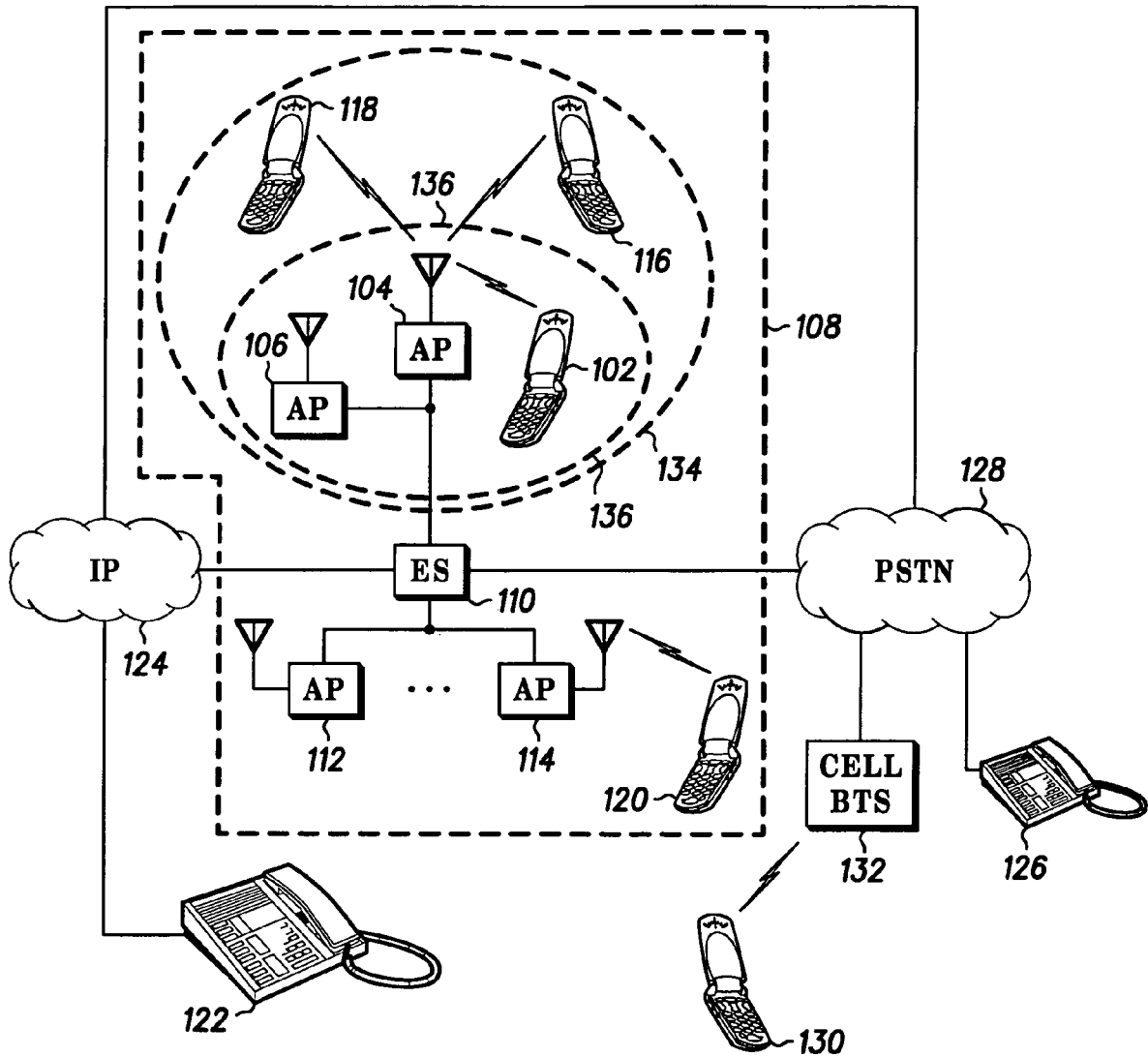
FIG. 1 depicts, in a simplified and representative form, an exemplary environment in which handover of service between access points of a wireless network through passive probing may be implemented.

In overview, the present disclosure concerns wireless communications devices or units, often referred to as communications units, such as cellular phones, two-way radios, Wireless LAN units (stations, or STAs, in 802.11 specifications) and the like, and wireless communications systems that provide services such as voice and data communications services to such communications units. More particularly, various inventive concepts and principles are embodied in systems, communications units, system access points, and methods therein for providing a handover of voice and data communications services between access points of a wireless network through passive probing, with passive probing being defined as a means by which a communications unit can receive a probe response without having to send a probe request, and the various ways that probe responses can be caused to occur and how communications units can be made aware of the channel and time the probe responses will be sent. Note that a probe response that is received by a communications unit without sending a probe request will alternatively also be referred to as a passive probe response. Note that the term communications unit may be used interchangeably herein with wireless subscriber device or unit, and each of these terms denotes a device ordinarily associated with a user. Examples of such units include personal digital assistants, personal assignment pads, and personal computers equipped for wireless operation, cellular handsets or devices, or equivalents thereof, each arranged to operate on a system as described below.

The communication systems and communications units that are of particular interest are those that may provide or facilitate short range communications capability normally referred to as WLAN capabilities, such as IEEE 802.11, Bluetooth, or Hiper-Lan and the like that preferably utilize orthogonal frequency division multiplex (OFDM), code division multiple access (CDMA), frequency hopping, or time division multiple access (TDMA) access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As further discussed below, various inventive principles and combinations thereof are advantageously employed to facilitate a WLAN communication session handover from service of a first wireless communications access point (first access point) to service of a second wireless communications access point (second access point) by providing for passive probing (receive probe response at the communications unit without sending probe request) of the second access point when the communications unit is operating on the service of the first access point and before the communications unit discovers that an association request and handover is required. In this manner, a user of the communications unit utilizing the methods and apparatus of the present invention experiences reduced delays and packet losses compared to a communications unit operating in a wireless environment in which service is handed over to a second access point only when a handover is needed.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processor and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

FIG. 1 shows a simplified and representative wireless environment or wireless communications system 100 in which components and areas within the system are not necessarily to scale. A communications unit 102 is movable between service of or from a first wireless communications access point (first access point) 104 and service of or from other access points, such as a second wireless access point (second access point) 106. In this exemplary embodiment, the first and second access points 104, 106 are access points within a wireless local area network (WLAN) 108 provided by an enterprise server 110 together with a plurality of access points. The communications unit 102 is also movable within service areas of additional access points within the WLAN 108 such as third access point 112 and fourth access point 114. Additional wireless communications units 116, 118 and 120 also are movable between service of the first, second, third and fourth access points 104, 106, 112, 114.

The communications unit 102 may be in contact with, for example, communications unit 120 via access point 114 and enterprise serer 110, communications unit 122 via an Internet Protocol (IP) connection 124, communications unit 126 via the public switched telephone network (PSTN) 128, or wireless communications unit 130 via a Base Transmitter Station (BTS) 132 or cellular WAN.

As shown in FIG. 1, the communications unit 102 is located in a first coverage area 134 provided by the first access point 104 and is currently being provided service by or operating on service of or from the first access point 104. However, as will be discussed in further detail in connection with FIG. 2, the communications unit 102 is programmed to monitor or passively monitor for probe responses or passive probe responses and synch messages transmitted by other access points that also provide wireless coverage in respective service areas such as the second access point 106, which provides wireless coverage in a second coverage area 136. This passive monitoring can be done continuously or when either the communications unit 102 or the first access point 104 determines that a handover is necessary, such as when the communications unit 102 is moving out of the first coverage area 134 or when the wireless service provided by the first access point 104 is otherwise inadequate. The probe responses and synch messages provide data to the communications unit 102 corresponding to other available access points, such as the second access point 106, with which it can potentially request an association and which can ultimately provide wireless service to the communications unit 102. In this manner, the communications unit 102 is said to be passively probing, since it is not transmitting a probe request, e.g. request for a probe response, but only passively monitors for and receives passive probe responses.

Note that in conventional WLAN, such as IEEE 802.11 the communications units initiate a handover of their wireless service needs from one access point to another. This is accomplished by sending a probe request directed to a particular access point and this probe request will result in that access point transmitting or broadcasting a probe response. Note that access points in known systems do not send probe requests. Here advantageously the communications units do not send probe requests, but still receive probe responses that can be utilized to prioritize and select an appropriate access point to provide wireless services to or to handover ongoing wireless services for the communications unit. In one approach, a probe request is sent to other access points by the access point that is presently providing service to the wireless communications unit. Note that the protocol conventions and contents for this probe request can be the same as the known probe requests from a communications unit.

The communications unit 102 and the first access point 104 are generally known other than the modifications and improvements disclosed herein. Thus the known functions and structure of such devices will not be described in detail other than as related to the inventive principles and concepts disclosed and discussed below.

Figure 2:
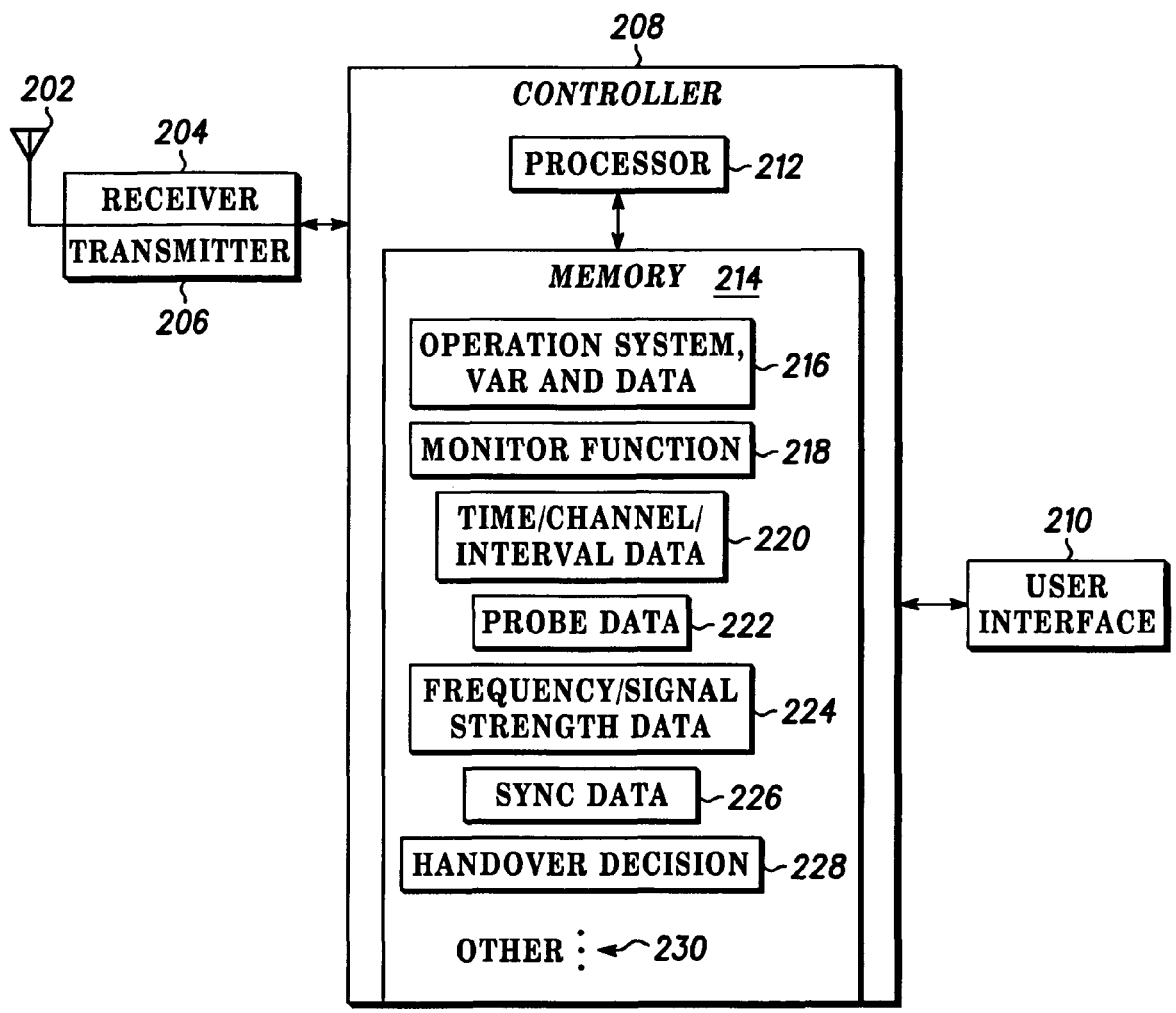
FIG. 2 depicts a block diagram of a communications unit capable of operating in a wireless network utilizing handover of service between access points of a wireless network through passive probing.

Referring to FIG. 2, a block diagram of a preferred embodiment of the communications unit 102 arranged for facilitating handover of service between access points of a wireless network through passive probing will be discussed and described. It should be noted that FIG. 2 may also be representative of the additional wireless communications units 116, 118 and 120. The communications unit 102 includes an antenna 202 that operates to absorb and radiate radio frequency signals that are received from the network, specifically the WLAN 108 in this embodiment, through at least the first and second access points 104, 106 but also from additional access points. For example, radio signals that are transmitted from the WLAN 108, such as, for example, signals from the first access point 104 are absorbed by the antenna 202 and input or provided to a receiver 204. The receiver 204 also receives radio signals such as probe responses and synchronization messages from access points not currently providing service to the communications unit 102. The receiver 204 may be controlled by the controller 208, as programmed, to only monitor signals such as probe responses transmitted by access points where those access points are identified by other messages and are access points that are within a predetermined distance of the communications unit 102. This predetermined distance and eligible access points may be those particular access points identified with locations within a certain distance of the access point 104 that is providing service to the communications unit 102 or simply those access points that are identified by the serving access point, and the like.

Signals that are amplified by and coupled from a transmitter 206 to the antenna 202 are radiated or transmitted to, for example, the first access point 104 and thus the enterprise server 110 as is known. The receiver and transmitter 204, 206 are inter coupled as depicted and interactively operate with and are controlled by a controller 208 to provide to, or accept or receive from, the controller 208 voice traffic or data messages or signals corresponding thereto as is also known.

The controller 208 operates in a known manner together with a user interface 210 that includes, for example, audio transducers, such as an earphone or speaker and microphone, a display and a keypad (not shown). The receiver 204, the transmitter 206 and user interface 210 are each interconnected as depicted to the controller 208, and the controller 208 provides overall operational command and control for the communications unit 102. The controller 208 is connected to and operates together with the display and keyboard or a set of keys (not shown) to effect a portion of a user interface experience that may depend on the particular device and its features, and to facilitate generation and consumption of voice or data messages or other information. The keyboard can be a known physical keyboard or virtual keyboard that is part of the display. The display is also known and may be a liquid crystal display or the like. If the keys are part of a virtual keyboard, the display will need to be touch sensitive or the like in order to convey information to the controller 208. Similarly the earphone, speaker and microphone are of the type that is commercially available.

The controller 208 is essentially a general-purpose processor and, preferably, includes a processor 212 and an associated memory source 214. The processor 212 is preferably a known processor based element with functionality that will depend on the specifics of the air interface with the WLAN 108 as well as on various network protocols for voice and data traffic. The processor 212 operates to encode and decode voice and data messages, including the probe responses and synchronization messages, to provide signals suitable for a transducer or for further processing by the controller 208. The processor 212 may include one or more microprocessors, digital signal processors, and other integrated circuits depending on the duties of the controller 208 with respect to signal processing duties that are not relevant to the present discussion.

In any event, the controller 208 also includes the memory source (memory) 214 that may be, for example, a combination of known RAM (Random Access Memory), ROM (Read-Only Memory), EEPROM (Electrically Erasable Programmable ROM) or magnetic memory. The memory 214 is used to store, for example, an operating system or software 216 for the processor 212 in addition to various items or programs. This operating software 216 when executed by the processor 212 will result in the processor 212 performing the requisite functions of the communications unit 102 such as, for example, interfacing with the user interface 210, transmitter 204 and receiver 206. The memory 214 further includes call processing routines not specifically shown for supporting voice and data calls that will be appreciated by one of ordinary skill and that will vary depending on air interface, call processing, and service provider or network specifics.

As depicted, the memory 214 further includes additional programs and data storage. Specifically, the memory 214 includes a monitor function 218, a time, channel and interval data storage 220, a probe data storage 222, a frequency and signal strength data storage 224, a synchronization data storage 226, a handover decision function 228 and other functions and storage 230 not discussed or described in the present disclosure. The monitor function 218 is used to monitor for signals included in the radio frequency signals received by the receiver 204 while operating within service of an access point, such as the first access point 104. For example, the controller 208 uses the monitor function 218 to monitor for messages transmitted by the first access point 104 and passive probe responses and synchronization messages transmitted by additional access points such as the second access point 106.

The time, channel and interval data storage 220 is used to store at least one of a predetermined time and a response interval at which the receiver 204 and controller 208 utilize the monitor function 218 to monitor for signals such as the probe responses and the synchronization messages. Typically, the determined time and response interval are obtained from the messages transmitted by the first access point 104, received by the receiver 204, and decoded by the controller 208. Alternately, the determined time and response interval can be programmed into the memory 214 so that the communications unit 102 knows at least one of the determined time and the response interval at which it should monitor for the probe response or the synchronization message. For example, the communications unit 102 may be programmed to monitor once every response interval on the defined channel.

The probe data storage 222 is used primarily to store probe data, otherwise referred to as access point data, and included in the probe responses. The probe data corresponds to the access point from which it was transmitted, and includes, for example, an identifier specific to the access point from which it was transmitted, location information for the access point from which it was transmitted, and handover information used by the communications unit 102 to request an association with the access point from which it was transmitted.

The memory 214 also includes the frequency and signal strength data storage 224. The controller 208 determines a frequency and signal strength or other indicia of signal quality, or, more generally, probe data, corresponding to the probe responses that are received by the receiver 204. The frequency and the signal strength corresponding to the probe responses are stored in the frequency and signal strength data storage 224.

The synchronization data storage 226 is used to store synchronization data (synch data) included in the synchronization messages. The synchronization message is typically optimized for improving signal strength measurement accuracy of received input signals including the probe responses. The memory 214 also includes a handover decision function 228 for determining if the communications unit 102 should switch from wireless service of one access point to wireless service of another access point. The handover decision function 228 also facilitates the switching from wireless service of one access point such as the first access point 104 to wireless service of another access point such as the second access point 106.

In operation, when the receiver 204 and the controller 208 receive and process signals such as the probe responses or the synchronization messages from multiple access points (also referred to as additional access points), the controller 208 prioritizes the multiple access points and selects an appropriate access point based on the probe data corresponding to the multiple access points. The communications unit 102, and specifically the controller 208, utilizes at least one of the probe data stored in the probe data storage 222, the synch data stored in the synchronization data storage 226, and the frequency and signal strength stored in the frequency and signal strength data storage 224 to prioritize the access points, select an appropriate access point, and therefore make handover decisions. Upon making a handover decision, the communications unit 102 requests an association with the appropriate access point and therefore initiates a WLAN handover within the WLAN 108.

For example, the communications unit 102 currently operating on service of the first access point 104 in a first coverage area on a communications session requiring a predetermined service quality, or quality of service (QoS), may receive probe responses from the second and third access points 106, 112. The communications unit 102 may analyze the probe data included in the probe responses transmitted by the respective access points and prioritize the second and third access points 106, 112 based on the probe data such as, for example, the location information included with the probe data corresponding to the second and third access points 106, 112. The communications unit 102 then selects, for example, the second access point 106 as the appropriate access point if the probe data indicates that the second access point 106 is in proximity to the first access point 104 and the third access point 112 is not in proximity to the first access point 104.

Figure 3:
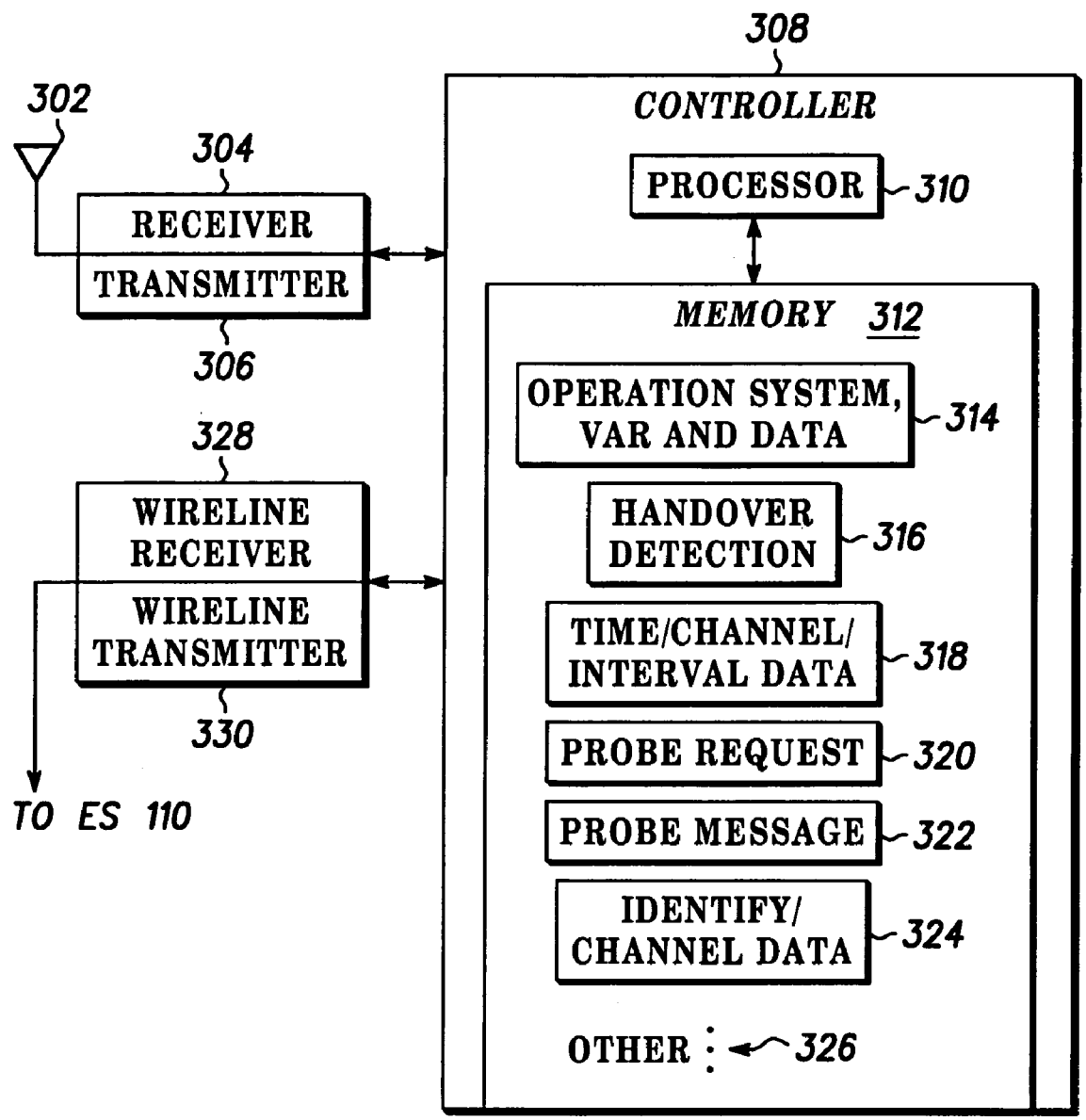
FIG. 3 depicts a block diagram of an access point arranged for facilitating handover of service to another access point.

Referring to FIG. 3, the access points including the first access point 104 include an antenna 302 that operates to absorb and radiate radio frequency signals including, for example, data signals that are received from or sent to the communications unit 102. These radio frequency signals are input or coupled to an access point receiver (AP receiver) 304. Signals that are amplified by and coupled from an access point transmitter (AP transmitter) 306 to the antenna 202 are radiated or transmitted to communications units or access points within the coverage area 134. Signals transmitted by the AP transmitter 306 include signals for receipt by the communications unit 102 and the second access point 106 as well as other access points. In one embodiment, a wireline transmitter 328 and wireline receiver 330 connect the access point 104 to the enterprise server 110 and other access points within the WLAN 108 if needed. Since the access points and enterprise server 110 are in fixed location they can utilize wired technologies, such as an Ethernet based network, to communicate with one another as is well known in the art and for reasons beyond the scope of the present discussion. In this manner, the communications unit 102 is operating on or being provided wireless service from the first access point 104 in the first coverage area 134.

The AP receiver 304 and AP transmitter 306 interactively operate with and are controlled by an access point controller (AP controller) 308, and may control at least one of a defined time and a response interval at which another access point that is not currently providing wireless service to the communications unit 102, for example the second access point 106, transmits probe responses for receipt by the communications unit 102. The probe responses transmitted by the second access point 106 include data associated with the second access point 106 and discussed above with reference to FIG. 2.

The AP controller 308 is essentially a general-purpose controller, and preferably includes a processor 310 and an associated memory source or memory 312. The processor 310 is preferably a known processor based element and may include one or more microprocessors, digital signal processors, and other integrated circuits depending on the duties of the AP controller 308 with respect to signal processing duties that are not relevant to the present discussion.

The AP controller 308 also includes the memory source (memory) 312 used to store various items or programs such as, for example, an operating system or software 314 for the processor 310. This operating software 314 when executed by the processor 310 will result in the processor 310 performing the requisite functions of the first access point 104 such as interfacing with the AP transmitter 304, AP receiver 306, and the wireline transmitter 330 and receiver 328. As depicted, the memory 312 further includes a handover detection function 316, time and interval data storage 318, probe request storage 320, probe message storage 322, identity and channel data storage 324, and other functions and storage 326 not discussed or described in the present disclosure.

The communications unit 102 may be programmed to monitor the WLAN signals transmitted by the AP transmitter 306 and to require that WLAN signals transmitted by the AP transmitter 306 as monitored by the communications unit 102 have a predetermined QoS. If the first access point 104 is not capable of providing WLAN signals with this predetermined QoS in the first coverage area, the communications unit 102 may autonomously determine that a handover is necessary and instruct the AP controller 308 to hand over the communications link to, for example, the second access point 106. Alternatively, the first access point 104 may use the handover detection function 316 to determine if a handover of a communications link is necessary. For example, the AP controller 308 may determine whether the communications unit 102 requires signals with a higher QoS or signal quality than the access point 104 is capable of providing. For example if the signal quality or QoS of signals received from the communications unit is at or below a target or predetermined QoS it is likely that signals transmitted from the access point to the communications unit are marginal as well. If so, the AP controller 308 may use the handover detection function 316 to make a handover decision to hand over the communications link to another access point. If the first access point 104 receives an indication, e.g. low received signal QoS, that the communications unit 102 is relocating or moving outside of or beyond the coverage area of the access point 104, the first access point 104 may make a handover decision to hand over the communications link using the handover detection function 316.

The AP controller 308 in cooperation with the AP transmitter may be configured to probe, e.g. send probe requests to the second access point 106, as well as other access points, at predetermined intervals. Alternatively, the AP controller 308 may cooperatively operate with the AP transmitter 304 and the AP receiver 306 to control, or compute at least one of the determined time and the response interval at which the second access point 106 (as well as other access points) sends probe requests according to the needs of the communications unit 102, and to store at least one of the determined time and the response interval in the time and interval data storage 318. Still further yet, the AP controller 308 may be programmed to monitor the second access point 106 through the AP receiver 306 to determine when to send probe requests to the second access point 106. The particular method by which the AP controller 308 operates to receive probe responses from other access points will depend on specific application environment and operating needs.

As discussed above, the first access point 104 preferably does not wait until a handover is needed to send probe requests to the second access point 106, but instead continuously sends the probe requests at predetermined intervals, and the communications unit 102 measures all probe responses and autonomously decides when a handover is necessary. Alternately, the first access point 104, and specifically the AP transmitter 306 and the AP controller 308, may communicate via a wireless connection or the wireline receiver 328 and transmitter 330 via a wireline connection with the second access point 106 to inform the second access point 106 of the determined time and the response interval at which the second access point 106 should transmit the probe response, or the first access point 104 may wait until a handover of service is needed to send a probe request to the second access point 106.

The first access point 104 may have no programmed information about other access points that are in proximity and may simply probe all possible channels where another access point may be available to send a probe response. Alternatively, the identity and channel data storage 324 of the memory 312 is used to store identity and channel information of one or more access points such as the second access point 106 that are in proximity to the first access point 104. The first access point 104 may only transmit the probe requests to the one or more access points such as the second access point 106 in proximity to the first access point 104 identified as handover candidates for the communications unit 102.

Figure 4:
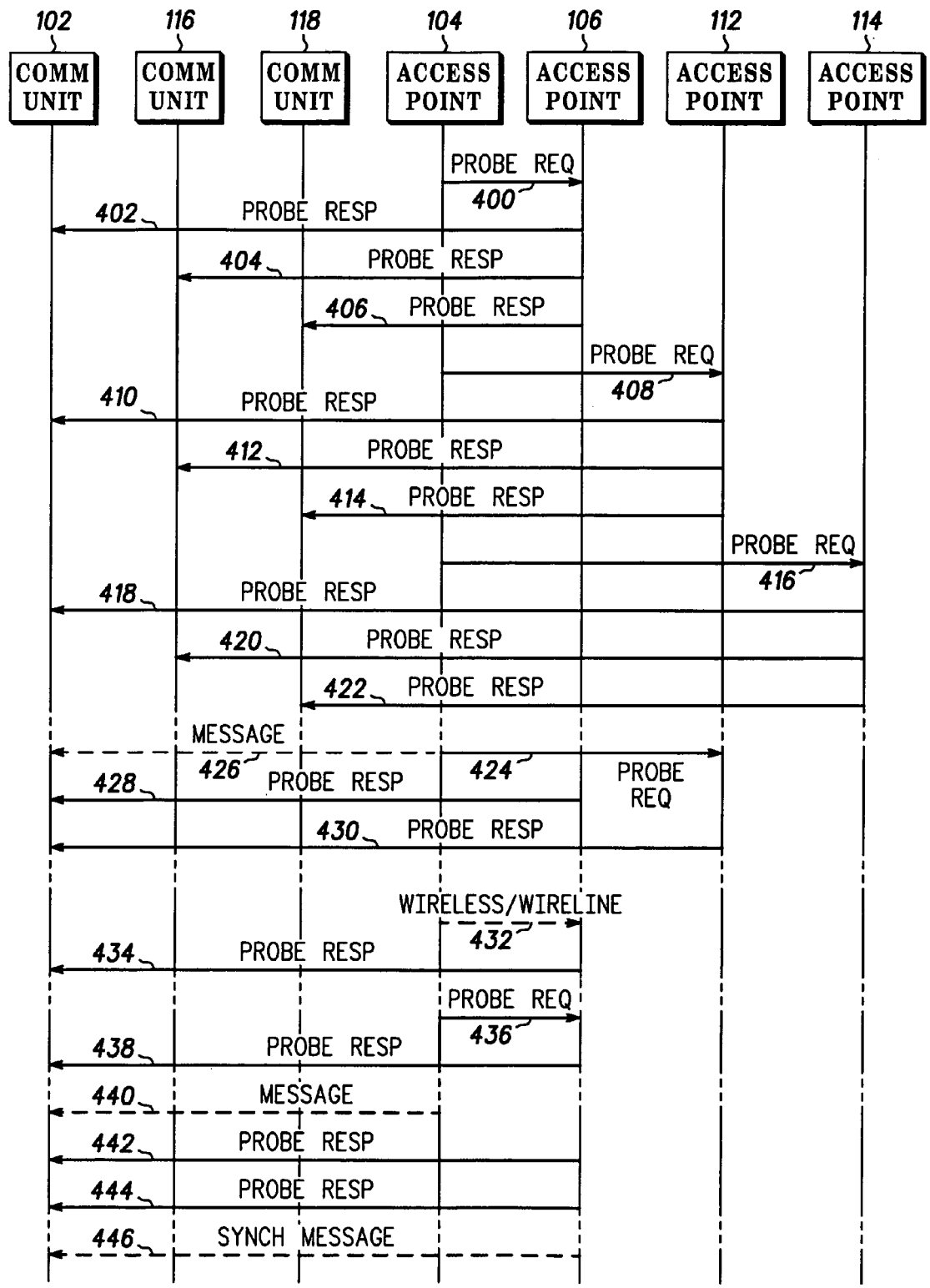
FIG. 4 depicts a ladder diagram illustrating various alternative passive probing methods for facilitating handover of wireless service between two wireless communications network access points.

Referring now to FIG. 4, a ladder diagram illustrating various methods of passive probing for facilitating handover of wireless service between two wireless access points will be discussed. It should be noted that the breaks in the ladder diagram (i.e., the dashes between certain of the steps) indicate that the steps preceding and following the break do not have to be performed together or in chronological order. Some of this discussion will be in the nature of a review and summary of portions of the above discussions. It is assumed that the first access point 104 provides wireless service to the first communications unit 102 as well as to the additional communications units 116, 118 as depicted in FIG. 1.

Referring first to FIG. 4, at 400, the first access point 104 determines, using the handover detection function 316, that it is the proper time for or other circumstances indicate that a handover of service is necessary for communications units 102, 116 and/or 118. This is initiated by sending probe requests to other access points. For example at 400 the first access point 104 transmits a probe request to the second access point 106. Or, as mentioned above, if the second access point 106 can be preconfigured to send probe responses at certain times or intervals, the first access point 104 need not even send a probe request at 400. Nonetheless, at 402, 404 and 406, the second access point 106, responsive to the probe request (or based on its preconfigured time and/or interval), transmits a probe response to the communications unit 102, 116 and 118. Even though the probe response is represented by time lines 402, 404 and 406, it should be appreciated that this is actually a single probe response that is broadcast from the second access point 106.

Similarly, at 408 and 416 the first access point 104 transmits probe requests to the third and fourth access points 112, 114 respectively. At 410, 412 and 414, the third access point 112 transmits or broadcasts a probe response to the communications units 102, 116 and 118 in response to the probe request transmitted at 408 by the first access point 104 or its schedule for probe responses. At 418, 420 and 422, the fourth access point 114 transmits a probe response to the communications units 102, 116 and 118 in response to the probe request transmitted at 416 by the first access point 104 or its schedule.

At this point, and as described above in connection with FIG. 2, the communications unit 102, for example, may prioritize the second, third and fourth access points 106, 112 and 114 based on the probe data included in the respective received probe responses including for example a QoS assessment of such data, services available, and the like. The communications unit 102 then selects one of the second, third and fourth access points 106, 112 and 114 as an appropriate access point with which to associate and proceeds to request an association with the appropriate selected access point.

It should be noted at this point that each access point is assigned a channel on which to operate. Therefore, the first access point 104 never instructs the other access points, such as, for example, the second access point 106, regarding the channel on which the access point 106 should send the probe response, as the second access point 106 always sends its probe response on its assigned channel. On the other hand, the first access point 104 may have to instruct the communications units 102, 116, 118 as to which channel to monitor to enable the communications units 102, 116, 118 to receive the probe response from the second access point 106, unless the communications units 102, 116, 118 are pre-configured with the appropriate access point channel data.

For example, as an alternative to the above passive probing protocol or process, in FIG. 4 at 424 the first access point 104 may be configured to send a probe request only to access points, such as access points 106, 112, that are in proximity to the first access point 104 and that therefore are potential handoff candidates. Note that the single line 424 is indicative of a probe request to both access points 106, 112. At 426, which may occur either immediately before or after sending of the probe request at 424, the access point 104 may, for example, transmit a message including response time and interval data, as well as access point channel data, to instruct the communications unit 102 (and, if necessary, communications units 116, 118 as well) as to which channels to monitor to enable the communications units 102, 116, 118 to receive probe responses from the access points 106, 112. The communications units 102, 116, 118 each store this received data in respective time, channel and interval data storages 220. At 428 and 430, the communications unit 102 then monitors the appropriate channels at the appropriate response time/interval for the probe responses transmitted by the second and third access points 106, 112.

According to another possible passive probing method shown in FIG. 4, at 432 the first access point 104 may communicate via a wireless or a wireline connection with the second access point at least one of the defined time and the response interval at which the second access point 106 is to send or broadcast a probe response. At 434, the second access point 106 may then transmit a probe response at at least one of the defined time or at the response interval to the first communications unit 102. Communications units 116 and 118 if necessary may also receive the message. In this scenario the communications units would have to know when to monitor for the probe response and this can be accomplished with programmed data or data obtained from the first access point as at 426

Further, referring to FIG. 4 at 436, the first access point 104 may be configured with identity and channel information of one or more access points in proximity to the first access point 104. Thus the first access point 104 can only transmit probe requests to access points that are in proximity to the first access point 104 and the communication units are programmed to monitor for responses from the access points as discussed above. Again, at 436 the first access point 104 communicates a probe request only to the second access point 106 since, as shown in FIG. 1, the second access point 106 is in proximity to the first access point 104. Therefore, the first access point 104 identifies the second access point 106 as a possible access point with which the wireless communications unit 102 can associate, also referred to as a handover candidate.

At 438, the second access point 106 transmits a probe response for receipt by the communications unit 102. It should be noted that the probe response may also be received by a plurality of other communications units such as the communication units 116, 118 if necessary.

In FIG. 4, according to yet another passive probing method, at 440 the first access point 104 may be configured to transmit a message including at least data regarding a regular response interval to the communications unit 102, and the communications unit 102 may store this data in the time, data and interval storage 318. The first access point 104 does not, however, communicate with the second access point 106. Rather, the second access point 106 is programmed to transmit probe responses at 442 and, for example, again at 444 at the regular response interval. The communications unit 102 uses the monitor function 218 to monitor for the probe responses at the response intervals.

In a variation of the above passive probing method, the first access point 104 may be configured neither to send probe requests to other access points nor to inform the communications units 102, 116, 118 about the timing at which the access points will transmit probe responses. Instead, each access point, such as the second access point 106, may be configured to broadcast the times and/or intervals at which it sends probe responses to all communications units within its coverage area. The communications units may then be configured to scan all channels until they learn the times and channels for all probe responses and then autonomously decide when to monitor for probe responses. In this example, at 442 and again at 444 the second access point 106 may transmit a probe response even if the communications unit 102 does not receive a message at 440 from the access point 104.

Alternatively, at 446 in FIG. 4, the second access point 106 may be configured to transmit a synchronization message including synch data. The communications unit 102 receives the synchronization message and stores the synch data in the synchronization data storage 226 to enable the communications unit 102 to more accurately measure the signal strength of responses from the access point 106 once the communications unit 102 determines when to monitor for the responses for use in determining handover candidates.

It should also be noted that at 400 through 446, it is not necessary that the first access point 104 has determined that a handover of service is necessary for the communications unit 102 or the additional communications units 116, 118. Rather, the communications unit 102 and the additional communications units 116, 118 may constantly or selectively scan access point channels for access point broadcasts within respective access point broadcast areas indicating times and channels for all probe responses, and then, based on probe responses, may autonomously decide on an appropriate access point for a handover, whether or not the communications unit is relocating to another service area or is involved in a communication session that requires a high QoS.

In this manner, passive probing of access points wherein an access point transmits a probe response without receiving a probe request directly from a communications unit provides for faster handovers since the communications unit can request an association with a new access point before the handover is necessary. In addition, passive access point probing provides for increased communications unit battery life because the communications units are not required to both request and receive the probes responses. In addition, passive access point probing reduces the likelihood of dropping a call or communication or experiencing poor network service when a service of a first access point is handed over to a second access point when the communications unit initiates an association request with the second access point before it is required.

It should be noted that the methods and apparatus described above for handover through passive probing may be implemented in reverse or with different communications networks other than the WLAN discussed above.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method to be performed by a wireless communications unit wherein the wireless communications unit is arranged and constructed for operating within a wireless local area network (WLAN) and operating on a first access point, the method comprising the steps of:
receiving information, from the first access point, wherein the information comprises, a probe response time and a probe response interval for a second access point;
storing the probe response time and the probe response interval;
when handover is necessary, passively monitoring for probe responses from the second access point at the stored probe response time and the probe response interval;
storing probe data corresponding to the probe responses from the second access point; and
making handover decisions for switching service from the first access point to the second access point based on the probe data corresponding to the probe responses from the second access point.

2. The method of claim 1, wherein receiving information from the first access point comprises receiving a first access point message including, for the second access point, the probe response time, an access point channel and the interval data.

3. The method of claim 2, wherein passively monitoring further comprises monitoring for the probe responses from the second access point based on the probe response time, the access point channel and the interval data included in the first access point message.

4. The method of claim 1 further comprising autonomously initiating the handover decisions based on at least a predetermined quality of service available from the first access point.

5. A communications unit comprising:
a receiver that receives input signals from a first wireless local area network (WLAN) access point, the input signals including information indicative of a defined time, access point channel and response interval for probe responses transmitted by a second WLAN access point, the receiver further for receiving the probe responses at the defined time and response interval for the probe responses transmitted by the second WLAN access point; a controller, coupled to and controlling the receiver, that passively monitors for the probe responses transmitted by the second WLAN access point, for decoding the probe responses received at the defined time and response interval, for storing probe data corresponding to the probe responses and for selectively initiating WLAN handovers within a WLAN based on the probe data, wherein the controller passively monitors for probe responses when handover is necessary and at the defined time and response interval for the second WLAN access point; and a transmitter, coupled to and controlled by the controller, that transmits output signals over the WLAN.

6. The communications unit of claim 5, wherein the controller is for selectively initiating the WLAN handovers within the WLAN by switching the communications unit between wireless service of the first access point and wireless service of the second access point.

7. The communications unit of claim 5, wherein the controller is for selectively initiating the WLAN handovers within the WLAN based on the probe data when the communications unit has an established communications session requiring a predetermined quality of service.

8. The communications unit of claim 5, wherein the receiver is further for receiving the probe responses based on received WLAN data indicating that the second WLAN access point transmitting the probe responses is an access point to be monitored, whereby the second WLAN access point is selected based on a predetermined distance from the receiver.

9. The communications unit of claim 8, wherein the received WLAN data comprises access point data for the second WLAN access point transmitting the probe responses, the access point data being received from an access point currently providing service to the communications unit.

10. The communications unit of claim 5, wherein:

the receiver is further for receiving a synchronization message including synchronization data transmitted by the second WLAN access point, the synchronization data for improving signal strength measurement accuracy of the input signals; and the controller is further for selectively initiating the WLAN handovers within the WLAN based on one of the probe data and the synchronization data.

* * * * *

UNITED STATES PATENT AND TRADEMARK OFFICE
CERTIFICATE OF CORRECTION

PATENT NO. : 7,936,725 B2
APPLICATION NO. : 11/236235
DATED : May 3, 2011
INVENTOR(S) : Bennett It is certified that error appears in the above-identified patent and that said Letters Patent is hereby corrected as shown below:

On Page 2, item (56), under "FOREIGN PATENT DOCUMENTS", in Column 2, Line 1, delete "130073" and insert -- 1330073 --, therefor.

Signed and Sealed this
First Day of January, 2013

David J. Kappos
*Director of the United States Patent and Trademark Office*